(12) United States Patent
Hosokawa (10) Patent No.: US 8,589,027 B2
(45) Date of Patent: Nov. 19, 2013

(54) STEERING ASSIST SYSTEM AND METHOD USING AUTOPILOT DEVICE

(75) Inventor: Tempei Hosokawa, Nishinomiya (JP)

(73) Assignee: Furuno Electric Company Limited, Hyogo (JP)

(*) Notice: Subject to any disclaimer, the term of this patent is extended or adjusted under 35 U.S.C. 154(b) by 364 days.

(21) Appl. No.: 12/958,733

(22) Filed: Dec. 2, 2010

(65) Prior Publication Data

US 2012/0143408 A1    Jun. 7, 2012

(51) Int. Cl.
*G05D 1/02* (2006.01)
*B63H 25/04* (2006.01)
*G06F 19/00* (2011.01)

(52) U.S. Cl.
USPC ............ 701/41; 180/446; 180/443; 180/447; 318/432; 440/62

(58) Field of Classification Search
USPC ............ 701/41; 180/443, 446, 447; 318/432; 440/62
See application file for complete search history.

(56) References Cited

U.S. PATENT DOCUMENTS

| | | |
|---|---|---|
| 5,235,927 A | 8/1993 | Singh et al. |
| 5,253,604 A | 10/1993 | Bohlin |
| 6,311,634 B1 | 11/2001 | Ford et al. |
| 8,150,569 B2 * | 4/2012 | Kaji ................................ 701/21 |
| 2004/0031429 A1* | 2/2004 | Kaufmann et al. ...... 114/144 RE |
| 2005/0199169 A1* | 9/2005 | Mizutani ................. 114/144 RE |
| 2007/0107977 A1* | 5/2007 | Shibata ........................ 180/444 |
| 2007/0178779 A1* | 8/2007 | Takada et al. ............... 440/61 S |
| 2007/0294008 A1* | 12/2007 | Yasui et al. ..................... 701/41 |
| 2009/0120714 A1* | 5/2009 | Hisanaga et al. ............. 180/446 |
| 2009/0228174 A1* | 9/2009 | Takagi et al. ................... 701/41 |
| 2009/0240389 A1* | 9/2009 | Nomura et al. ................. 701/29 |
| 2009/0241823 A1* | 10/2009 | Borrett ......................... 114/151 |
| 2009/0312909 A1* | 12/2009 | Onuma .......................... 701/41 |
| 2010/0022146 A1* | 1/2010 | Morvillo ........................ 440/84 |
| 2010/0147618 A1* | 6/2010 | Osonoi et al. ................. 180/403 |
| 2010/0191421 A1* | 7/2010 | Nilsson .......................... 701/41 |
| 2010/0204887 A1* | 8/2010 | Ichinose et al. ................ 701/41 |

\* cited by examiner

*Primary Examiner* — Tuan C. To
(74) *Attorney, Agent, or Firm* — Global IP Counselors, LLP (57) ABSTRACT

A steering assist system for a vehicle includes a turning device, a steering device, a steering sensor and an autopilot device. The steering device is operable to apply a first turning force to the turning device. The steering sensor detects a steering state of the steering device during which the steering device applies the first turning force. The autopilot device automatically navigates the vehicle to a desired heading of the vehicle. The autopilot device includes an actuator and a steering assist control section. The actuator is operable to apply a second turning force to the turning device. The steering assist control section controls the actuator to apply the second turning force to turn the turning device in the same direction that the first turning force is turning the turning device when the steering sensor detects the steering state of the steering device.

17 Claims, 6 Drawing Sheets

STEERING ASSIST SYSTEM AND METHOD USING AUTOPILOT DEVICE

BACKGROUND

1. Field of the Invention

The present invention generally relates to a steering assist system for a vehicle. More specifically, the present invention relates to a steering assist system for a vehicle that employs an autopilot device.

2. Background Information

A conventional marine vehicle generally includes a rudder device, a steering device, and an autopilot device (see U.S. Pat. Nos. 5,235,927, 5,253,604, and 6,311,634, for example). The rudder device mainly has a rudder and a steering cylinder. The steering cylinder is coupled to the rudder, and actuates the rudder. That is, the steering device manually operates the rudder device to control a heading of the marine vehicle. The steering device mainly has a helm and a helm pump. The helm is manually operated by a helmsman, thereby operating the helm pump according to a steering operation of the helm. The helm pump is hydraulically coupled to the steering cylinder of the rudder device. Hence, the helm pump operates the steering cylinder of the rudder device according to the steering operation of the helm, thereby actuating the rudder.

As understood in the art, the autopilot device electrically operates the rudder device to control the heading of the marine vehicle to automatically track a preset target course. The autopilot device mainly includes an operation unit, a heading sensor, a controller and an autopilot actuator. The controller is electrically coupled to the operation unit, the heading sensor and the autopilot actuator. The autopilot actuator is hydraulically coupled to the steering cylinder of the rudder device. The controller controls the autopilot actuator based on signals from the operation unit and the heading sensor, thereby operating the steering cylinder of the rudder device. Furthermore, the autopilot device also allows the helmsman to input a steering command with keys or dials disposed on the operating unit for steering the marine vehicle.

With the conventional steering device, the helm can be used to steer the marine vehicle in an intuitive manner. However, the steering device requires some physical effort by the helmsman to operate the helm. On the other hand, the autopilot device electrically steers the marine vehicle without requiring the helmsman to operate the helm. However, since the helmsman needs to input the steering command from the operating unit to steer the marine vehicle, it is difficult for the helmsman to steer the marine vehicle with the autopilot device in an intuitive manner.

SUMMARY

The present invention was conceived in light of the above-mentioned problems. One object of the present invention is to provide a steering assist system which requires less physical effort for steering a vehicle.

In accordance with one aspect of the present invention, a steering assist system for a vehicle includes a turning device, a steering device, a steering sensor and an autopilot device. The turning device is connected to the vehicle and is operable to influence a heading of the vehicle. The steering device is operable to apply a first turning force to the turning device to operate the turning device. The steering sensor is configured to detect a steering state of the steering device during which the steering device applies the first turning force to operate the turning device. The autopilot device is configured to automatically navigate the vehicle to a desired heading of the vehicle. The autopilot device includes an actuator and a steering assist control section. The actuator is operable to apply a second turning force to the turning device to operate the turning device. The steering assist control section is configured to control the actuator to apply the second turning force to turn the turning device in the same direction that the first turning force is turning the turning device when the steering sensor detects the steering state of the steering device.

With this steering assist system, it is possible to provide a steering assist system which requires less physical effort for steering a vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
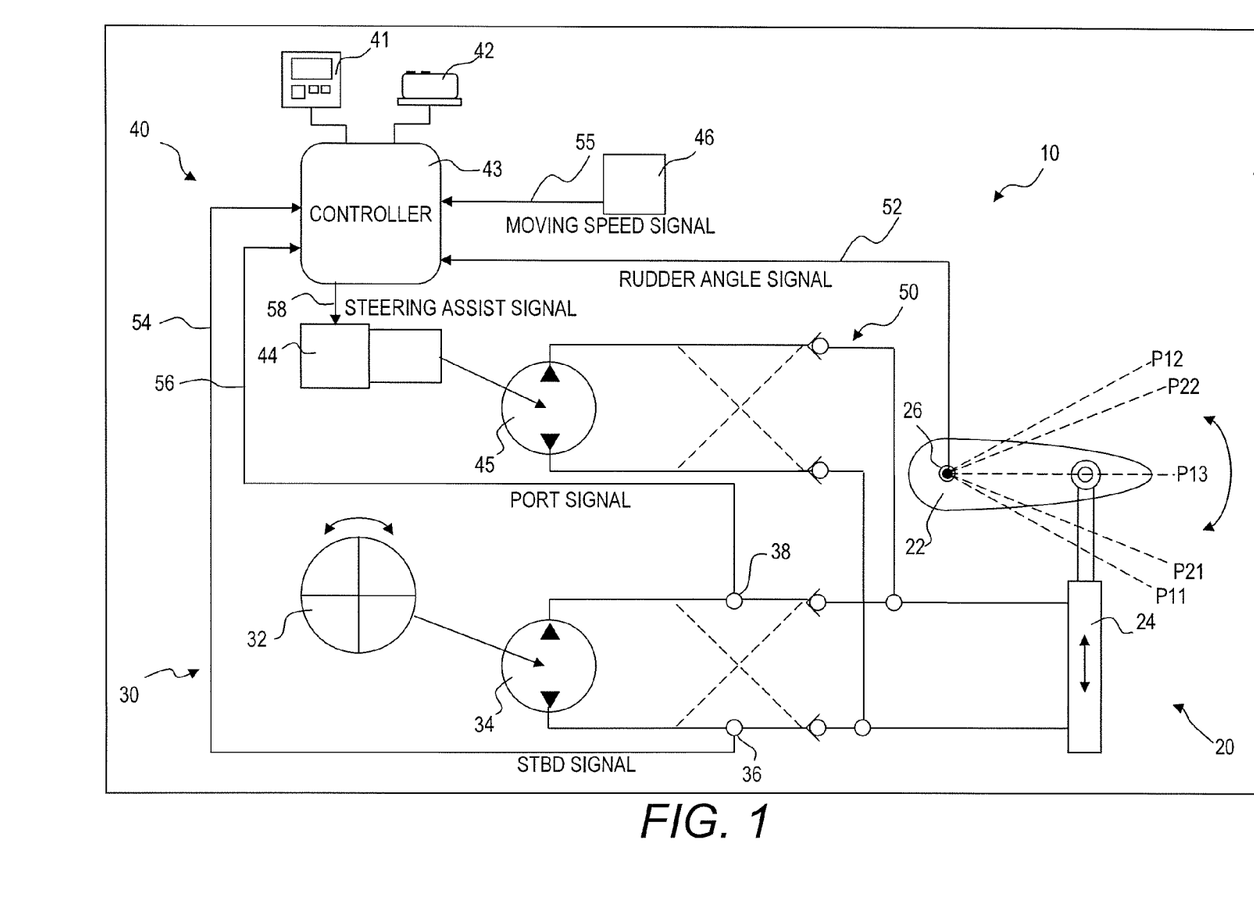
FIG. 1 is a schematic block diagram of an example of a steering assist system in accordance with a first embodiment.

Referring initially to FIG. 1, a marine vehicle (e.g., vessel) 1 is illustrated in accordance with a first embodiment. The marine vehicle 1 mainly includes a steering assist system 10.

The steering assist system 10 basically includes, among other things, a rudder device (e.g., turning device) 20, a steering device 30, an autopilot device 40 and a hydraulic circuit 50. The rudder device 20 mainly has a rudder 22, a steering cylinder 24 and a rudder angle sensor (e.g., turning angle sensor) 26. The steering device 30 mainly has a helm 32, a helm pump 34 and a pair of steering sensors 36 and 38. The autopilot device 40 mainly includes an operation unit 41, the controller 43, an autopilot pump motor (e.g., part of actuator) 44, and an autopilot pump (e.g., part of actuator) 45. The steering assist system 10 further includes various sensors, such as a heading sensor 42 and a moving speed sensor (e.g., speed sensor) 46.

The rudder device 20 is connected to the marine vehicle 1, and operable to influence a heading of travel of the marine vehicle 1. The rudder 22 is provided on a rearward position of a body of the marine vehicle 1. The steering cylinder 24 is mechanically coupled to the rudder 22, and turns the rudder 22 about a rotation axle of the rudder 22 between clockwise and counterclockwise mechanical limit positions P11 and P12, respectively, that are located at opposite sides relative to a neutral position P13 of the rudder 22.

The rudder angle sensor 26 detects a rudder angle (e.g., turning angle) of the rudder 22 with respect to the neutral position P13 of the rudder in a conventional manner that are well known in the art. The rudder angle sensor 26 provides a rudder angle signal 52 indicative of the rudder angle of the rudder 22. In this embodiment, when the rudder 22 is turned in the counterclockwise direction in FIG. 1 (i.e., in a direction toward the counterclockwise mechanical limit position P12) such that the marine vehicle 1 turns to the starboard side of the marine vehicle 1, the rudder angle signal 52 has a positive value. On the other hand, when the rudder 22 is turned in the clockwise direction in FIG. 1 (i.e., in a direction toward the clockwise mechanical limit position P11) such that the marine vehicle 1 turns to the port side of the marine vehicle 1, the rudder angle signal 52 has a negative value.

The steering device 30 operates the rudder device 20 to manually control the heading of travel of the marine vehicle 1. The helm 32 is manually operated in either clockwise or counterclockwise direction (e.g., steering direction) by a helmsman, thereby rotating the helm pump 34 according to a steering operation of the helm 32. The helm pump 34 is hydraulically coupled to the steering cylinder 24 of the rudder device 20 through the hydraulic circuit 50. The helm pump 34 applies a first hydraulic pressure (e.g., first turning force) to the steering cylinder 24 of the rudder device 20 according to the steering operation of the helm 32, thereby turning the rudder 22. The steering sensors 36 and 38 detect a steering state of the steering device 30 during which the steering device 30 applies the first turning force to operate the rudder device 20. In particular, the steering sensors 36 and 38 detect a flow of fluid in the hydraulic circuit 50. The steering sensors 36 and 38 can be conventional components that are well known in the art. For example, the steering sensors 36 and 36 can be a sensor that is directly coupled to the helm 32 or the helm pump 34, and that directly detects the steering direction of the helm 32 or a rotation direction of the helm pump 34. Thus, these structures will not be discussed or illustrated in detail herein.

Then, the steering sensors 36 and 38 output a STBD signal 54 (indicating turing in the starboard direction) and a PORT signal (indicating turing in the port direction) 56, respectively, to the controller 43 of the autopilot device 40, according the detected flow of fluid in the hydraulic circuit 50. More specifically, the steering sensor 36 outputs the STBD signal 54 with a high voltage level while the helm 32 is rotating in the clockwise direction to turn the marine vehicle 1 in the starboard direction, and outputs the STBD signal 54 with a low voltage level while the helm 32 is not rotating in the clockwise direction (i.e., while the helm 32 is rotating in the counterclockwise direction, or the helm 32 is not rotating). Here, the high voltage level is set at a predetermined level that is higher than the low voltage level. On the other hand, the steering sensor 38 outputs the PORT signal 56 with the high voltage level while the helm 32 is rotating in the counterclockwise direction to turn the marine vehicle 1 in the port direction, and outputs the PORT signal 56 with the low voltage level while the helm 32 is not rotating in the counterclockwise direction (i.e., while the helm 32 is rotating in the clockwise direction, or the helm 32 is not rotating). As understood in the art, the autopilot device 40 operates the rudder device 20 to electrically control the heading of travel of the marine vehicle 1 to consistently maintain a desired heading or automatically track a preset target course. The operation unit 41 has a display, a plurality of keys and a dial. The operation unit 41 is operated by the helmsman to input the preset target course, or a steering command for electrically steering the marine vehicle 1. The heading sensor 42 has, for example, a gyrocompass, a magnetic compass, a satellite compass, global positioning (GPS) equipment, and so forth, and provides a heading signal indicative of the heading of travel of the marine vehicle 1 to the controller 43. The moving speed sensor 46 detects a moving speed of the marine vehicle 1 in a conventional manner that is well known in the art, and provides a moving speed signal 55 indicative of the moving speed of the marine vehicle 1 to the controller 43. The controller 43 is electrically coupled to the operation unit 41, the heading sensor 42, the autopilot pump motor 44 and the moving speed sensor 46. The controller 43 controls the autopilot pump motor 44 based on signals from the operation unit 41, the heading sensor 42 and the moving speed sensor 46. The autopilot pump 45 is hydraulically coupled to the steering cylinder 24 of the rudder device 20 through the hydraulic circuit 50. The autopilot pump motor 44 operates the autopilot pump 45, thereby operating the steering cylinder 24 of the rudder device 20. Specifically, the autopilot pump motor 44 applies a second hydraulic pressure (e.g., second turning force) to the steering cylinder 24 of the rudder device 20 via the autopilot pump 45, thereby turning the rudder 22.

The controller 43 also performs a steering assist control for assisting the steering operation of the helm 32. The steering assist control of the controller 43 basically applies the second hydraulic pressure to turn the rudder 22 in the same direction that the first hydraulic pressure is turning the rudder 22 when one of the steering sensors 36 and 38 detects the steering state of the steering device 30. In particular, the controller 43 outputs a steering assist signal 58 indicative of a steering assist value (i.e., a control value) to the autopilot pump motor 44, thereby applying the second hydraulic pressure corresponding to the steering assist value of the steering assist signal 58 to the steering cylinder 24 of the rudder 22 via the autopilot pump 45. As a result, the rudder 22 is operated by receiving an assist force (i.e., the second hydraulic pressure) from the autopilot device 40 in addition to the first hydraulic pressure generated by the steering operation of the steering device 30. Specifically, the steering assist control of the controller 43 begins to apply the second hydraulic pressure in response to one of the STBD and PORT signals 54 and 56 from the steering sensors 36 and 38 indicating the steering state of the steering device 30. Furthermore, the steering assist control of the controller 43 stops applying the second hydraulic pressure when none of the steering sensors 36 and 38 detects the steering state of the steering device 30.

Figure 2:
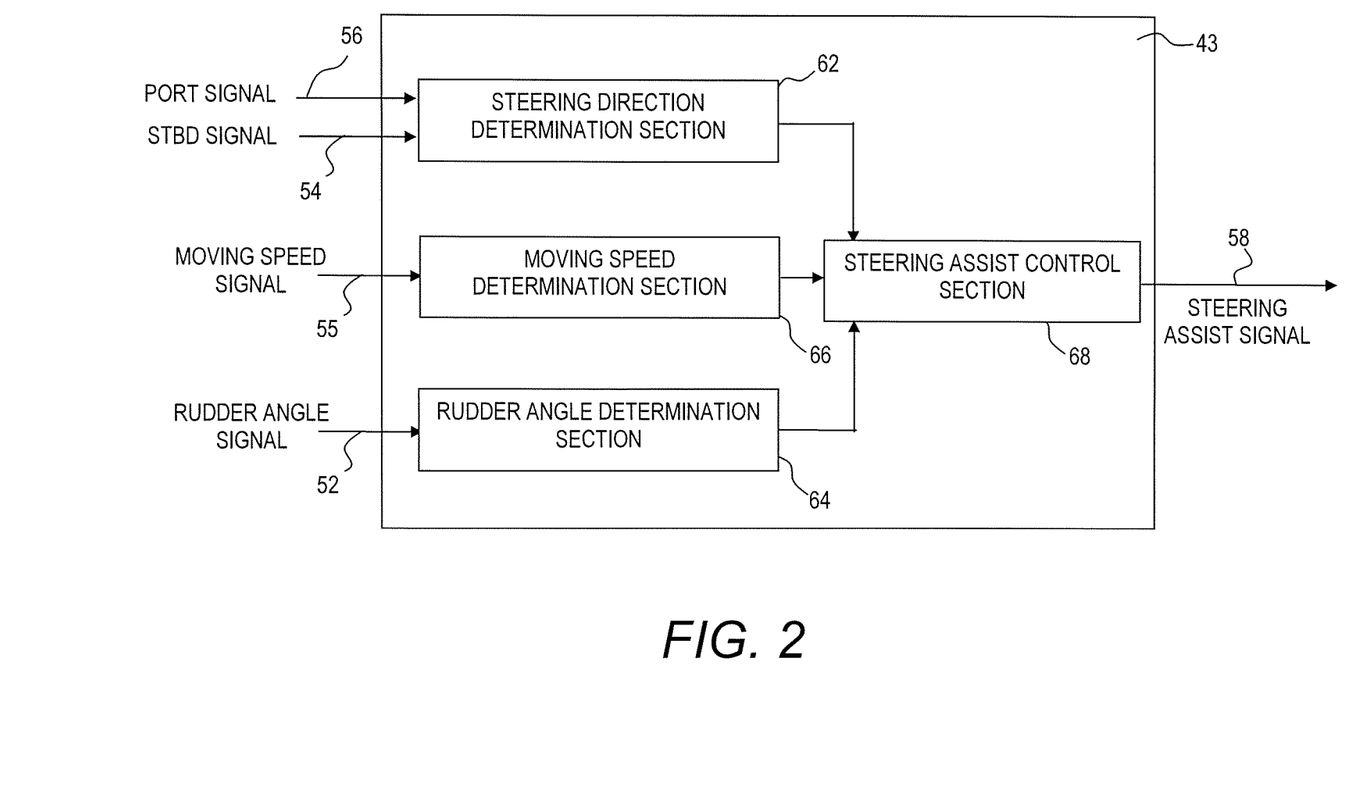
FIG. 2 is a detailed block diagram of an example of the controller of the steering assist system illustrated in FIG. 1.

As illustrated in FIG. 2, the controller 43 in this example includes a steering direction determination section 62, a rudder angle determination section 64, a moving speed determination section 66 and a steering assist control section 68. The steering direction determination section 62, the rudder angle determination section 64, the moving speed determination section 66 and the steering assist control section 68 are part of the controller 43 that can be a single integrated unit or several individual units that are operatively connected together. The controller 43 preferably includes a microcomputer with a steering assist control program that performs the steering assist control for assisting the steering operation of the helm 32 as discussed below. The controller 43 further includes various conventional components such as one or more microprocessors, an input/output interface (I/O) and storage devices such as a ROM (Read Only Memory) device and a RAM (Random Access Memory) device. The microcomputer of the controller 43 is programmed to control, among other things, the second hydraulic pressure applied to the steering cylinder 24 of the rudder device 20. The memory circuit stores processing results and control programs as needed to carry out the steering assist control as explained below. The input/output interface (I/O) of the controller 43 receives input information from various vehicle sensors. Thus, the controller 43 is operatively coupled to the various components of the marine vehicle 1 in a conventional manner. The internal RAM of the controller 43 stores statuses of operational flags and various control data. The internal ROM of the controller 43 stores the various data for various operations. The controller 43 is capable of selectively controlling any of the components of the steering assist system 10 in accordance with the control program as needed and/or desired. It will be apparent to those skilled in the art from this disclosure that the precise structure and algorithms for the controller 43 can be any combination of hardware and software that will carry out the functions of the embodiments discussed herein.

Figure 3:
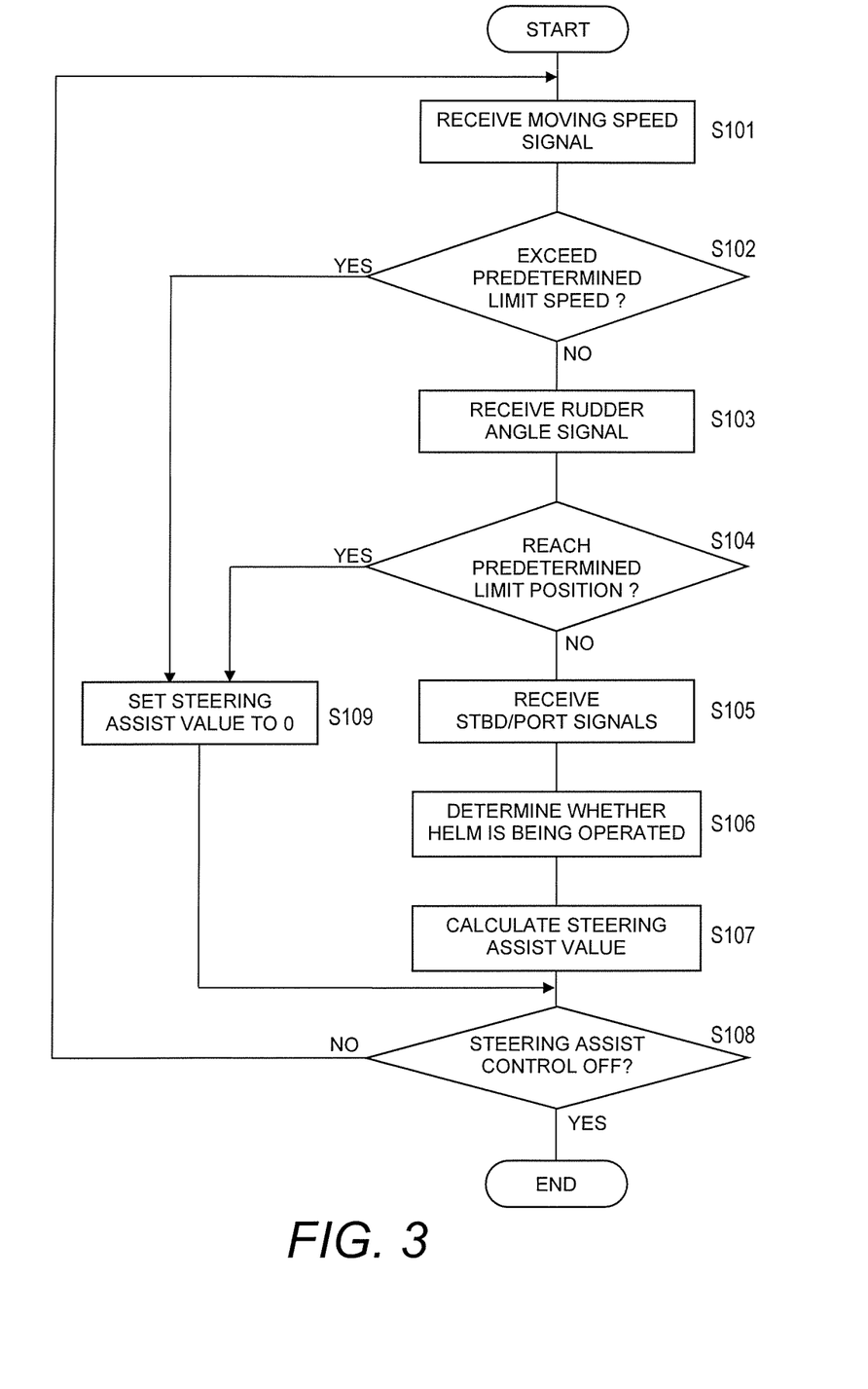
FIG. 3 is a flow chart illustrating an example of steering assist control operations performed by the steering assist system illustrated in FIG. 1.

Referring to FIGS. 2 and 3, an example of the steering assist control operations performed by the controller 43 will be described in detail. The steering assist control of the controller 43 can be manually activated and inactivated through the operation unit 41. When the helmsman operates the keys of the operation unit 41 to turn on the steering assist control, the controller 43 starts to perform the exemplary steering assist control operations illustrated in FIG. 3.

When the steering assist control is turned on, the moving speed determination section 66 receives the moving speed signal 55 from the moving speed sensor 46 (Step S101). Then, the moving speed determination section 66 determines whether the moving speed of the marine vehicle 1 in the direction of travel of the marine vehicle 1 exceeds a predetermined limit speed in the direction of travel of the marine vehicle 1 based on the moving speed signal 55 (Step S102). Specifically, the moving speed determination section 66 determines whether the moving speed of the marine vehicle 1 exceeds a predetermined limit speed for forward traveling, such as 7 knots, while the marine vehicle 1 travels forward. Furthermore, the moving speed determination section 66 determines whether the moving speed of the marine vehicle 1 exceeds a predetermined limit speed for backward traveling, such as 7 knots, while the marine vehicle 1 travels backward. Note that the predetermined limit speeds can be user-configurable by operating the operation unit 41. If the moving speed determination section 66 determines that the moving speed of the marine vehicle 1 in the direction of travel of the marine vehicle 1 exceeds the predetermined limit speed in the direction of travel of the marine vehicle 1 based on the moving speed signal 55 ("Yes" in Step S102), then the steering assist control section 68 sets the steering assist value of the steering assist signal 58 to zero (Step S109) so that the autopilot pump motor 44 does not apply the second hydraulic pressure to the steering cylinder 24 of the rudder device 20 via the autopilot pump 45. Furthermore, the steering assist control section 68 determines whether the steering assist control has been turned off (Step S108). If the steering assist control section 68 determines that the steering assist control has not been turned off ("No" in Step S108), then the process returns to Step S101. On the other hand, if the steering assist control section 68 determines that the steering assist control has been turned off ("Yes" in Step S108), then the steering assist control is turned off.

If the moving speed determination section 66 determines that the moving speed of the marine vehicle 1 in the direction of travel of the marine vehicle 1 does not exceed the predetermined limit speed in the direction of travel of the marine vehicle 1 based on the moving speed signal 55 ("No" in Step S102), then the rudder angle determination section 64 receives the rudder angle signal 52 from the rudder angle sensor 26 (Step S103). Then, the rudder angle determination section 64 determines whether the rudder 22 has reached either a predetermined clockwise limit position P21 or a predetermined counterclockwise limit position P22 of the rudder 22 based on the rudder angle signal 52 (Step S104). As illustrated in FIG. 1, the predetermined clockwise limit position P21 is set to an angular position that is less than the clockwise mechanical limit position P11 in the counterclockwise direction about the rotation axle of the rudder 22 by a predetermined angle, such as 5 degrees. The predetermined counterclockwise limit position P22 is set to an angular position that is less than the counterclockwise mechanical limit position P12 in the clockwise direction about the rotation axle of the rudder 22 by a predetermined angle, such as 5 degrees. Note that the predetermined angles can be user-configurable by operating the operation unit 41.

If the rudder angle determination section 64 determines that the rudder 22 has reached either the predetermined clockwise limit position P21 or the predetermined counterclockwise limit position P22 of the rudder 22 based on the rudder angle signal 52 ("Yes" in Step S104), then the steering assist control section 68 sets the steering assist value of the steering assist signal 58 to zero (Step S109) so that the autopilot pump motor 44 does not apply the second hydraulic pressure to the steering cylinder 24 of the rudder device 20 via the autopilot pump 45. Furthermore, the steering assist control section 68 determines whether the steering assist control has been turned off (Step S108). If the steering assist control section 68 determines that the steering assist control has not been turned off ("No" in Step S108), then the process returns to Step S101. On the other hand, if the steering assist control section 68 determines that the steering assist control has been turned off ("Yes" in Step S108), then the steering assist control is turned off If the rudder angle determination section 64 determines that the rudder 22 has not reached either the predetermined clockwise limit position P21 or the predetermined counterclockwise limit position P22 of the rudder 22 based on the rudder angle signal 52 ("No" in Step S104), then the steering direction determination section 62 receives the STBD and PORT signals 54 and 56 from the steering sensors 36 and 38 (Step S105). Then, the steering direction determination section 62 determines whether the helm 32 is being operated in either the clockwise or counterclockwise direction based on the STBD and PORT signals 54 and 56 (Step S106). Specifically, if the STBD signal 54 from the steering sensor 36 has the high voltage level, then the steering direction determination section 62 determines that the helm 32 is rotating in the clockwise direction to turn the marine vehicle 1 in the starboard side of the marine vehicle 1. On the other hand, if the PORT signal 56 from the steering sensor 38 has the high voltage level, then the steering direction determination section 62 determines that the helm 32 is rotating in the counterclockwise direction to turn the marine vehicle 1 in the port side of the marine vehicle 1. Furthermore, if both of the STBD and PORT signals 54 and 56 have the low voltage level, then the steering direction determination section 62 determines that the helm 32 is not being operated.

Figure 4A:
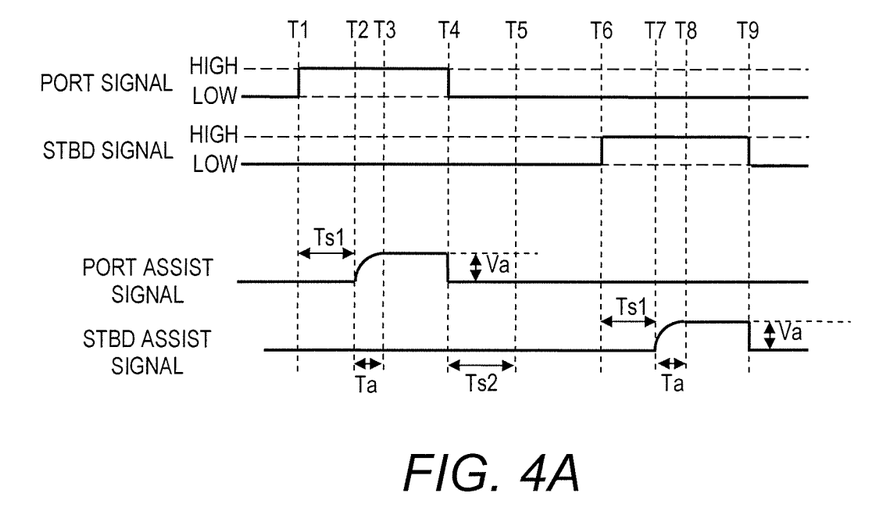
FIG. 4A is a timing chart illustrating an exemplary relationship between steering signals and steering assist signals occurring during the steering assist control operations illustrated in FIG. 3.
Figure 4B:
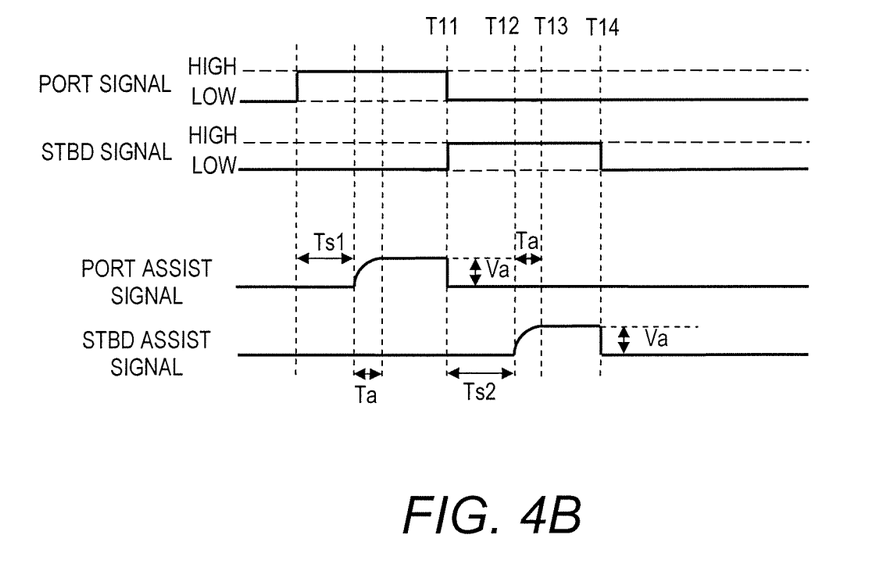
FIG. 4B is a timing chart illustrating another exemplary relationship between steering signals and steering assist signals occurring during the steering assist control illustrated in FIG. 3.

Then, the steering assist control section 68 calculates the steering assist value for controlling the autopilot pump motor 44 (Step S107), and then the steering assist control section 68 outputs the steering assist signal 58 indicative of the steering assist value to the autopilot pump motor 44, to cause the autopilot pump 45 to apply the second hydraulic pressure corresponding to the steering assist value of the steering assist signal to the steering cylinder 24 of the rudder 22. The steering assist control section 68 then determines whether the steering assist control has been turned off (Step S108). If the steering assist control section 68 determines that the steering assist control has not been turned off ("No" in Step S108), then the process goes back to Step S101. On the other hand, if the steering assist control section 68 determines that the steering assist control has been turned off ("Yes" in Step S108), then the steering assist control is turned off Referring to FIGS. 4A and 4B, the determination of the steering direction (Step S106) and the calculation of the steering assist value (Step S107) will be described in detail. FIGS. 4A and 4B illustrate a relationship between the STBD and PORT signals 54 and 56 and the steering assist signal 58 having STBD and PORT assist signals with STBD and PORT assist values (i.e., steering assist value), respectively. As illustrated in FIG. 4A, when the steering direction determination section 62 detects a transition of the PORT signal 56 from the low voltage level to the high voltage level (i.e., a rising edge of the PORT signal 56) at a time T1, then the steering assist control section 68 starts to output the PORT assist signal with a positive PORT assist value at a time T2 after a first delay period Ts1 has elapsed from the time T1. Note that the first delay period Ts1 can be user-configurable by operating the operation unit 41. For example, the first delay period Ts1 can be set to 50 msec, 100 msec, 200 msec, or any suitable value. The steering assist control section 68 calculates the PORT assist value of the PORT assist signal so that the PORT assist value of the PORT assist signal gradually increases to a target steering assist value during a time period Ta, and then reaches the target steering assist value at a time T3. The target steering assist value of the PORT assist value is preset to a predetermined assist value Va in this embodiment. The target steering assist value will be described later in detail with reference to FIG. 5.

The steering assist control section 68 maintains the predetermined assist value Va of the PORT assist signal while the PORT signal 56 has the high voltage level until the steering direction determination section 62 detects a transition of the PORT signal 56 from the high voltage level to the low voltage level (i.e., a falling edge of the PORT signal 56) at a time T4. If the steering direction determination section 62 detects the transition of the PORT signal 56 from the high voltage level to the low voltage level at the time T4, then the steering assist control section 68 set the PORT assist value of the PORT assist signal to zero. On the other hand, the STBD assist value of the STBD assist signal is maintained to zero while the STBD signal 54 has the low voltage level until the steering direction determination section 62 detects a transition of the STBD signal 54 from the low voltage level to the high voltage level (i.e., a rising edge of the STBD signal 54) at a time T6. If the steering direction determination section 62 detects the transition of the STBD signal 54 from the low voltage level to the high voltage level at the time T6, then the steering assist control section 68 starts to output the STBD assist signal with a positive STBD assist value at a time T7 after the first delay period Ts1 has elapsed from the time T6. The STBD assist value of the STBD assist signal gradually increases to a target steering assist value during the time period Ta, and then reaches the predetermined assist value Va at a time T8. The target steering assist value of the STBD assist value is preset to the predetermined assist value Va in this embodiment. The target steering assist value will be described later in detail with reference to FIG. 5. The steering assist control section 68 maintains the predetermined assist value Va of the STBD assist signal while the STBD signal 54 has the high voltage level until the steering direction determination section 62 detects a transition of the STBD signal 54 from the high voltage level to the low voltage level (i.e., a falling edge of the STBD signal 54) at a time T9. If the steering direction determination section 62 detects the transition of the STBD signal 54 from the high voltage level to the low voltage level at the time T9, then the steering assist control section 68 sets the STBD assist value of the PORT assist signal to zero. Naturally, the operations discussed above would occur in a similar manner if the STBD signal was first detected, and then the PORT signal was detected.

Also, if the helm 32 is suddenly steered in the other direction while the helm 32 is being steered in one direction, then the steering direction determination section 62 detects the rising edge of one of the STBD and PORT signals 54 and 56 corresponding to the other direction of the helm 32 at the same time of or immediately after (such as less than 100 msec after) the steering direction determination section 62 detecting the falling edge of the other of the STBD and PORT signals 54 and 56 (at a time T11 in FIG. 4B, for example). In this case, the steering assist control section 68 sets the steering assist value of the steering assist signal corresponding to the other of the STBD and PORT signals 54 and 56 to zero in response to the steering direction determination section 62 detecting the falling edge of the other of the STBD and PORT signals 54 and 56. On the other hand, the steering assist control section 68 prevents the steering assist value of the steering assist signal corresponding to the one of the STBD and PORT signals 54 and 56 from increasing from zero until at least a second delay period Ts2 (100 msec, for example) has elapsed from the time of the steering direction determination section 62 detecting the falling edge of the other of the STBD and PORT signals 54 and 56. Note that the second delay period Ts2 can be a preset value, or can be user-configurable by operating the operation unit 41. Specifically, as shown in FIG. 4B, the steering assist control section 68 prevents the STBD assist signal from increasing from zero until the second delay period Ts2 has elapsed from the time T11 in the case that the second delay period Ts2 is equal to or longer than the first delay period Ts1 (when Ts1=50 msec and Ts2=100 msec, for example). Then, the steering assist control section 68 starts to increase the STBD assist value of the STBD assist signal from zero at a time T12. On the other hand, the steering assist control section 68 prevents the STBD assist signal from increasing from zero until the first delay period Ts1 has elapsed from the time T11 in the case that the second delay period Ts2 is shorter than the first delay period Ts1 (when Ts1=200 ms and Ts2=100 msec, for example). Then, the steering assist control section 68 starts to increase the STBD assist value of the STBD assist signal from zero. Furthermore, the STBD assist value of the STBD assist signal gradually increases to the predetermined assist value Va during the time period Ta, and then reaches the predetermined assist value Va at a time T13. The steering assist control section 68 maintains the predetermined assist value Va of the STBD assist signal while the STBD signal 54 has the high voltage level until the steering direction determination section 62 detects the transition of the STBD signal 54 from the high voltage level to the low voltage level at a time T14. Since the steering assist control section 68 prevents the STBD assist signal from increasing from zero until at least the second delay period Ts2 has elapsed from the time T11, the autopilot pump motor 44 is prevented from rapidly rotating in reverse directions even if the helm 32 is suddenly steered in the other direction while the helm 32 is being steered in one direction. Naturally, similar operations occur if the STBD signal is detected first and then the PORT signal is detected.

Figure 5:
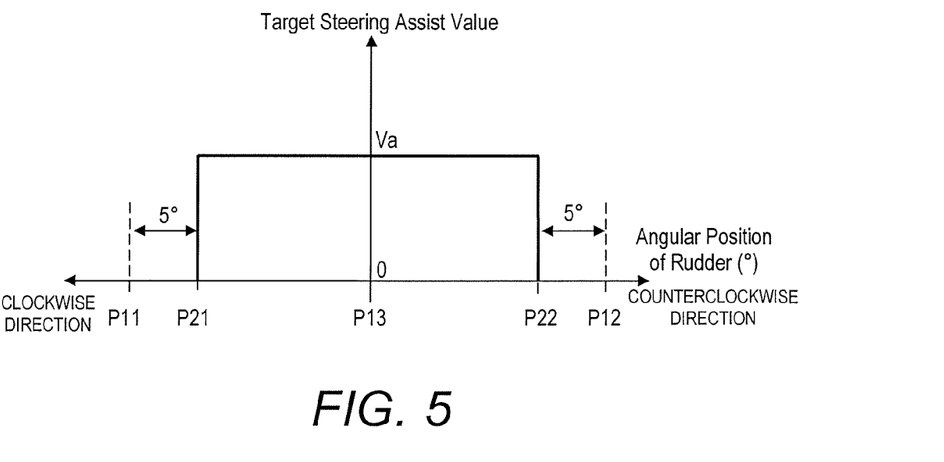
FIG. 5 is a schematic diagram illustrating an exemplary relationship between an angular position of a rudder and a target steering assist value effected by the steering assist signals.

The target steering assist value of the steering assist signal 58 (i.e., the STBD and PORT assist signals) will be described in detail with reference to FIG. 5. FIG. 5 illustrates an exemplary relationship between the angular position of the rudder 22 and the target steering assist value of the steering assist signal 58. The target steering assist value is set to the predetermined assist value Va that is a positive constant value independent of the angular position of the rudder 22 when the angular position of the rudder 22 is between the predetermined counterclockwise limit position P22 and the predetermined clockwise limit position P21 (see also FIG. 1, for example). Furthermore, the target steering assist value is set to be zero when the angular position of the rudder 22 is not between the predetermined counterclockwise limit position P22 and the predetermined clockwise limit position P21. In other words, the target steering assist value is set to be zero when the angular position of the rudder 22 is beyond the predetermined counterclockwise limit position P22 or the predetermined clockwise limit position P21.

As discussed above, the autopilot pump motor 44 receives the steering assist signal 58 from the steering assist control section 68, and drives the autopilot pump 45 according to the steering assist value of the steering assist signal 58. Here, PWM (pulse-width modulation) is used to control the autopilot pump motor 44. In particular, a driver circuit (not shown) of the autopilot pump motor 44 generates a pulse train that is sent to a motor body of the autopilot pump motor 44, and changes the pulse width of the pulse based on the steering assist value of the steering assist signal 58, while keeping the pulse period of the pulse constant, such as 100 msec. The autopilot pump motor 44 controls a turning speed (e.g., turning rate) of the rudder 22 by changing the duty cycle of the pulse based on the steering assist value of the steering assist signal 58. For example, when the duty cycle is set to 100%, with one continuous pulse that leads to a constant high signal, the autopilot pump motor 44 drives the autopilot pump 45 to generate the second hydraulic pressure so that the second hydraulic pressure turns the rudder 22 of the rudder device 20 at a speed of, for example, 10 degrees per second. In the case when the duty cycle is set to 50%, with half of a period being high and half of a period being low, the autopilot pump motor 44 drives the autopilot pump 45 to generate the second hydraulic pressure so that the second hydraulic pressure turns the rudder 22 of the rudder device 20 at a speed of, for example, 5 degrees per second. Furthermore, when the duty cycle is set to 0%, with no high pulse, the autopilot pump motor 44 does not drive the autopilot pump 45, and does not generate the second hydraulic pressure to turn the rudder 22.

When the STBD and PORT assist values are zero, then the duty cycle is set to 0% (e.g., a period between the times T1 and T2, and a period between the times T4 and T7 in FIG. 4A, for example). In this case, the autopilot pump motor 44 does not drive the autopilot pump 45, and does not generate the second hydraulic pressure to turn the rudder 22. On the other hand, when the STBD assist value is the predetermined assist value Va (e.g., a period between the times T8 and T9), then the duty cycle is set to, for example, 50%. In this case, the autopilot pump 45 generates the second hydraulic pressure so that the second hydraulic pressure turns the rudder 22 in the counterclockwise direction at the speed of 5 degrees per second (e.g., prescribed turning rate). Furthermore, when the STBD assist value is between zero and the predetermined assist value Va (e.g., a period between the times T7 and T8), then the autopilot pump 45 generates the second hydraulic pressure so that the second hydraulic pressure turns the rudder 22 in the counterclockwise direction at a speed (e.g., turning speed) between 0 degree per second and 5 degrees per second in proportion to the STBD assist value. As a result, the rudder 22 is operated to steer the marine vehicle 1 in the starboard side by receiving the second hydraulic pressure from the autopilot device 40 in addition to the first hydraulic pressure generated by the steering operation of the steering device 30. Furthermore, if the PORT assist value is the predetermined assist value Va (e.g., a period between the times T3 and T4), then the duty cycle is set to 50%. In this case, the autopilot pump 45 generates the second hydraulic pressure so that the second hydraulic pressure turns the rudder 22 in the clockwise direction at the speed of 5 degrees per second (e.g., prescribed turning rate). Furthermore, when the PORT assist value is between zero and the predetermined assist value Va (e.g., a period between the times T2 and T3), then the autopilot pump 45 generates the second hydraulic pressure so that the second hydraulic pressure turns the rudder 22 in the clockwise direction at a speed (e.g., turning speed) between 0 degree per second and 5 degrees per second in proportion to the PORT assist value. As a result, the rudder 22 is operated to steer the marine vehicle 1 in the port side by receiving the second hydraulic pressure from the autopilot device 40 in addition to the first hydraulic pressure generated by the steering operation of the steering device 30.

With the steering assist system 10, it is possible to provide a steering assist system which requires less physical workload for steering the marine vehicle 1 since the second hydraulic pressure generated by the autopilot device 40 is applied to turn the rudder 22 in the same direction that the first hydraulic pressure generated by the steering device 30 is turning the rudder 22. Furthermore, with the steering assist system 10, the autopilot device 40 is used to generate the second hydraulic pressure. Thus, it is not necessary to additionally provide a power-steering system to reduce the physical effort by the helmsman, which also reduces the manufacturing cost of the steering assist system 10.

In this embodiment, the steering assist system 10 is installed on the marine vehicle 1. However, the steering assist system 10 in accordance with the first embodiment can be applied to the steering systems of different types of vehicles, such as terrestrial vehicles (e.g., cars, trucks and so on) and aircrafts.

As can further be appreciated from the above, with the steering assist system 10, the target steering assist value of the steering assist signal 58 is set to the predetermined assist value Va. Here, the predetermined assist value Va can be user-configurable by operating the operation unit 41. If the target steering assist value of the steering assist signal 58 is set to be larger than the predetermined assist value Va, then the turning speed of the rudder 22 can be faster than 5 degrees per second, which corresponds to the predetermined assist value Va. If the target steering assist value of the steering assist signal 58 is set to be smaller than the predetermined assist value Va, then the turning speed of the rudder 22 can be slower than 5 degrees per second. Alternatively, the duty cycle corresponding to the predetermined assist value Va can be user-configurable by operating the operation unit 41. If the duty cycle corresponding to the predetermined assist value Va is set to be larger than 50%, then the turning speed of the rudder 22 corresponding to the predetermined assist value Va can be faster than 5 degrees per second. If the duty cycle corresponding to the predetermined assist value Va is set to be smaller than 50%, then the turning speed of the rudder 22 corresponding to the predetermined assist value Va can be slower than 5 degrees per second.

Also, with the steering assist system 10, if the moving speed determination section 66 determines that the moving speed of the marine vehicle 1 in the direction of travel of the marine vehicle 1 exceeds the predetermined limit speed in the direction of travel of the marine vehicle 1 based on the moving speed signal 55 ("Yes" in Step S102), then the steering assist control section 68 sets the steering assist value of the steering assist signal 58 to zero (Step S109). Alternatively, if the determination result is affirmative ("Yes" in Step S102), then the steering assist control of the controller 43 can be inactivated or turned off so that the autopilot pump motor 44 does not apply the second hydraulic pressure to the steering cylinder 24 of the rudder device 20 via the autopilot pump 45. Moreover, with the steering assist system 10, the steering assist control of the controller 43 is activated by the operation unit 41. However, the steering assist control of the controller 43 can be activated based on the moving speed signal 55. In particular, the controller 43 can automatically activate the steering assist control when the controller 43 determine that the moving speed of the marine vehicle 1 is within a predetermined range, such as between 7 knots in the backward direction and 7 knots in the forward direction, based on the moving speed signal 55.

Furthermore, with the steering assist system 10, if the rudder angle determination section 64 determines that the rudder 22 has reached either the predetermined clockwise limit position P21 or the predetermined counterclockwise limit position P22 of the rudder 22 based on the rudder angle signal 52 ("Yes" in Step S104), then the steering assist control section 68 sets the steering assist value of the steering assist signal 58 to zero (Step S109). Alternatively, if the determination result is affirmative ("Yes" in Step S104), then the steering assist control of the controller 43 can be inactivated or turned off so that the autopilot pump motor 44 does not apply the second hydraulic pressure to the steering cylinder 24 of the rudder device 20 via the autopilot pump 45. Moreover, with the steering assist system 10, the steering assist control of the controller 43 is activated by the operation unit 41. However, the steering assist control of the controller 43 can be activated based on the rudder angle signal 52. In particular, the controller 43 can automatically activate the steering assist control when the controller 43 determine that the rudder angle of the rudder 22 is within a predetermined range, such as between the predetermined clockwise limit position P21 and the predetermined counterclockwise limit position P22, based on the ruder angle signal 52.

Moreover, with the steering assist system 10, if the rudder angle determination section 64 determines that the rudder 22 has reached either the predetermined clockwise limit position P21 or the predetermined counterclockwise limit position P22 of the rudder 22 based on the rudder angle signal 52 ("Yes" in Step S104), then the steering assist control section 68 sets the steering assist value of the steering assist signal 58 to zero (Step S109). Alternatively, even if the determination result is affirmative ("Yes" in Step S104), the steering assist control section 68 can increase the steering assist value of the steering assist signal 58 to the predetermined assist value Va to apply the second hydraulic pressure to the rudder 22 to turn the rudder 22 towards the neutral position P13 when the helm 32 is being operated such that the rudder 22 turns towards the neutral position P13. With this configuration, if the rudder 22 has reached one of the predetermined clockwise limit position P21 or the predetermined counterclockwise limit position P22 of the rudder 22, then the rudder 22 is prevented from being turned by the autopilot device 40 beyond the one of the predetermined clockwise limit position P21 and the predetermined counterclockwise limit position P22 of the rudder 22, however, the rudder 22 can be turned by the autopilot device 40 towards the neutral position P13.

In addition, with the steering assist system 10, the steering assist control of the controller 43 is activated and inactivated by the operation unit 41. Furthermore, the steering assist control of the controller 43 can be activated and inactivated based on a positioning data of the marine vehicle 1. In particular, the controller 43 receives the positioning data from the heading sensor 42. Furthermore, the controller 43 receives a map data from a storage device (not shown). Then, the controller 43 determines whether the marine vehicle 1 is traveling within a steering assist control activation area. The steering assist control activation area is a predetermined area, such as a harbor, that is preset in the map data. When the controller 43 determines that the marine vehicle 1 is traveling within the steering assist control activation area, then the controller 43 activates the steering assist control. Furthermore, when the controller 43 determines that the marine vehicle 1 is not traveling within the steering assist control activation area, then the controller 43 inactivates the steering assist control. With this configuration, the autopilot device 40 can automatically start to assist the steering operation of the steering device 30 in the predetermined area where the steering assist control is preferably performed. Furthermore, the autopilot device 40 can automatically end to assist the steering operation of the steering device 30 outside the predetermined area.

Furthermore, the steering assist control of the controller 43 can also be activated and inactivated depending on how close the marine vehicle 1 is located to a port where the marine vehicle 1 is docking. In particular, the controller 43 receives a distance data from a distance sensor (not shown) that detects a distance between the marine vehicle 1 and the port. The distance sensor can be a conventional component that is well known in the art, such as an infrared or laser sensor, an acoustic sensor and so forth. Furthermore, the controller 43 determines whether the distance between the marine vehicle 1 and the port is shorter than a predetermined distance, such as 10 meters. Note that the predetermined distance can be user-configurable by operating the operation unit 41. When the controller 43 determines that the distance between the marine vehicle 1 and the port is longer than the predetermined distance, then the controller 43 activates the steering assist control. Furthermore, when the controller 43 determines that the distance between the marine vehicle 1 and the port is shorter than the predetermined distance, then the controller 43 inactivates the steering assist control. With this configuration, the autopilot device 40 can automatically start to assist the steering operation of the steering device 30 when the marine vehicle 1 is apart from the port more than the predetermined distance. Furthermore, the autopilot device 40 can automatically end to assist the steering operation of the steering device 30 when the marine vehicle 1 is approaching the port.

Second Embodiment

Figure 6:
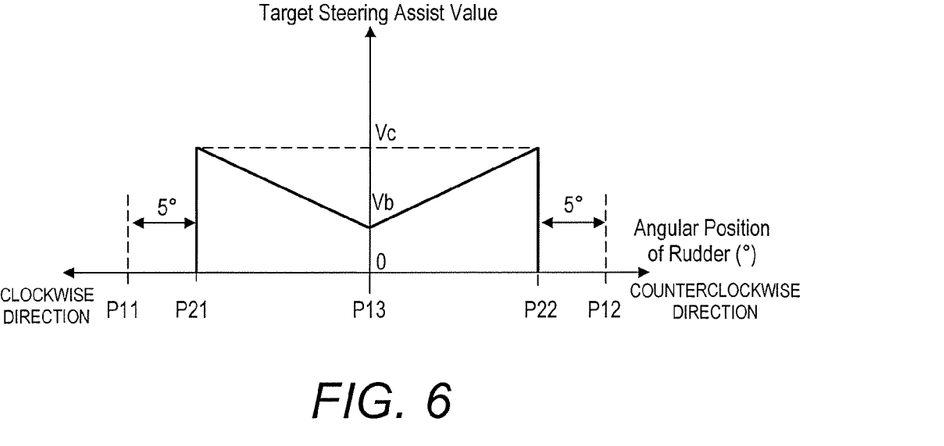
FIG. 6 is a schematic diagram illustrating an exemplary relationship between an angular position of a rudder and a target steering assist value effected by the steering assist signals in accordance with a second embodiment.

Referring now to FIG. 6, a steering assist system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

With the steering assist system 10 in accordance with the first embodiment, the target steering assist value of the steering assist signal 58 is set to the predetermined assist value Va that is a positive constant value independent of the angular position of the rudder 22 when the angular position of the rudder 22 is between the predetermined counterclockwise limit position P22 and the predetermined clockwise limit position P21. On the other hand, in this embodiment, the target steering assist value of the steering assist signal 58 can be set according to the angular position of the rudder 22 when the angular position of the rudder 22 is between the predetermined counterclockwise limit position P22 and the predetermined clockwise limit position P21.

FIG. 6 illustrates an exemplary relationship between the angular position of the rudder 22 and the target steering assist value of the steering assist signal 58 (i.e., the STBD and PORT assist signals). As illustrated in FIG. 6, the target steering assist value of the steering assist signal 58 decreases to a predetermined assist value Vb as the angular position of the rudder 22 approaches the neutral position P13, and increases to a predetermined assist value Vc as the angular position of the rudder 22 approaches the predetermined counterclockwise limit position P22 or the predetermined clockwise limit position P21. Note that the predetermined assist values Vb and Vc can be user-configurable by operating the operation unit 41. For example, the predetermined assist value Vb can be set smaller than the predetermined assist value Va, and the predetermined assist value Vc can be set larger than the predetermine assist value Va. As a result, the autopilot device 40 decreases the amount of the second turning force applied to the rudder 22 as the angular position of the rudder 22 approaches the neutral position P13, and increases the amount of the second turning force applied to the rudder 22 as the angular position of the rudder 22 approaches the predetermined counterclockwise limit position P22 or the predetermined clockwise limit position P21.

With this configuration, when the rudder 22 is positioned near the neutral position P13, the autopilot device 40 less assists the steering operation of the steering device 30, and gives more priority to the steering operation of the steering device 30. Thus, it becomes easier for the helmsman to navigate the marine vehicle 1 so that the marine vehicle 1 heads straight.

Referring to FIG. 6, the target steering assist value of the steering assist signal 58 linearly increase as the angular position of the rudder 22 approaches the predetermined counterclockwise limit position P22 or the predetermined clockwise limit position P21. However, the target steering assist value of the steering assist signal 58 can non-linearly increase as the angular position of the rudder 22 approaches the predetermined counterclockwise limit position P22 or the predetermined clockwise limit position P21.

Third Embodiment

Figure 7:
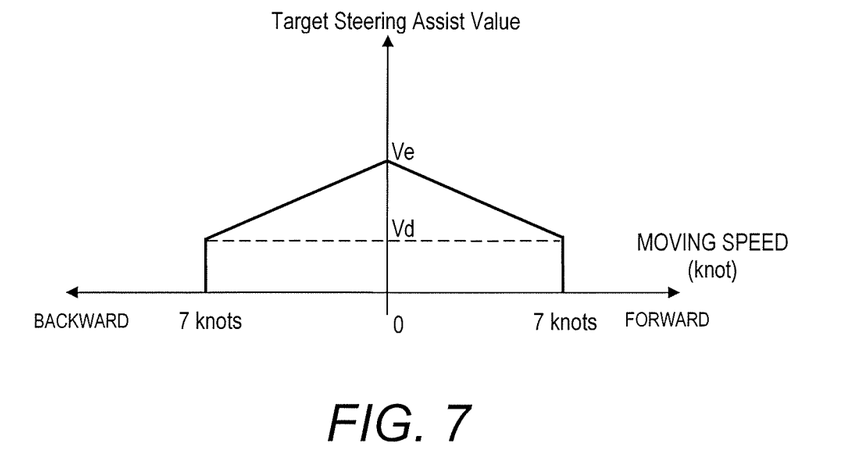
FIG. 7 is a schematic diagram illustrating an exemplary relationship between a moving speed of a marine vehicle and a target steering assist value effected by the steering assist signals in accordance with a third embodiment.

Referring now to FIG. 7, a steering assist system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

With the steering assist system 10 in accordance with the first embodiment, the target steering assist value of the steering assist signal 58 is set to the predetermined assist value Va that is a positive constant value independent of the moving speed of the marine vehicle 1 when the moving speed of the marine vehicle 1 in the direction of travel of the marine vehicle 1 does not exceed the predetermined limit speed in the direction of travel of the marine vehicle 1. On the other hand, in this embodiment, the target steering assist value of the steering assist signal 58 can be set according to the moving speed of the marine vehicle 1 when the moving speed of the marine vehicle 1 in the direction of travel of the marine vehicle 1 does not exceed the predetermined limit speed in the direction of travel of the marine vehicle 1.

FIG. 7 illustrates a relationship between the moving speed of the marine vehicle 1 and the target steering assist value of the steering assist signal 58 (i.e., the STBD and PORT assist signals). As illustrated in FIG. 7, the target steering assist value of the steering assist signal 58 decreases to a predetermined assist value Vd as the moving speed in the direction of travel of the marine vehicle 1 approaches the predetermined limit speed (7 knots, for example) in the direction of travel of the marine vehicle 1, and increases to a predetermined assist value Ve as the moving speed in the direction of travel of the marine vehicle 1 approaches zero. Note that the predetermined assist values Vd and Ve can be user-configurable by operating the operation unit 41. For example, the predetermined assist value Vd can be set smaller than the predetermined assist value Va, and the predetermined assist value Ve can be set larger than the predetermine assist value Va. As a result, the autopilot device 40 decreases the amount of the second turning force applied to the rudder 22 as the moving speed in the direction of travel of the marine vehicle 1 approaches the predetermined limit speed in the direction of travel of the marine vehicle 1, and increases the amount of the second turning force applied to the rudder 22 as the moving speed in the direction of travel of the marine vehicle 1 approaches zero.

The marine vehicle 1 normally travels at slower speed in a harbor than outside the harbor. In the harbor, the helmsman needs to steer the helm 32 more often than outside the harbor to avoid obstructs such as piers and other marine vehicles. With the steering assist system in accordance with the third embodiment, the autopilot device 40 can assist the steering operation of the steering device 30 more when the marine vehicle 1 travels at slower speed. Thus, it becomes easier for the helmsman to navigate the marine vehicle 1 in the harbor.

As can be further appreciated from FIG. 7, the target steering assist value of the steering assist signal 58 linearly decrease as the moving speed in the direction of travel of the marine vehicle 1 approaches the predetermined limit speed in the direction of travel of the marine vehicle 1. However, the target steering assist value of the steering assist signal 58 can non-linearly decrease as the moving speed in the direction of travel of the marine vehicle 1 approaches the predetermined limit speed in the direction of travel of the marine vehicle 1.

Fourth Embodiment

Figure 8:
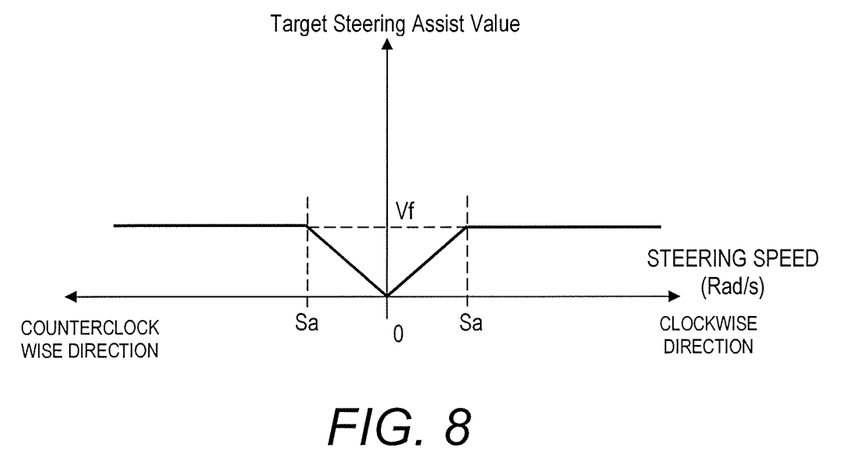
FIG. 8 is a schematic diagram illustrating an exemplary relationship between a steering speed of a helm and a steering assist value effected by the steering assist signal in accordance with a fourth embodiment.

Referring now to FIG. 8, a steering assist system in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

As with the steering assist system 10 in accordance with the first embodiment, the steering sensors 36 and 38 detect the steering state of the steering device 30. In this embodiment, the steering sensors 36 and 38 can detect a steering speed (e.g., steering rate) of the helm 32 as the steering state of the steering device 30. Furthermore, the target steering assist value of the steering assist signal 58 can be set according to the steering speed detected by the steering sensors 36 and 38. In other words, the steering sensors 36 and 38 also operate as a steering speed sensor (e.g., steering rate sensor).

FIG. 8 illustrates an exemplary relationship between the steering speed of the helm 32 and the target steering assist value of the steering assist signal 58 (i.e., the STBD and PORT assist signals). As illustrated in FIG. 8, the target steering assist value of the steering assist signal 58 decreases to zero as the steering speed approaches zero, and increases to a predetermined assist value Vf as the steering speed approaches a predetermined speed Sa. Furthermore, the target steering assist value of the steering assist signal 58 is set to the predetermined assist value Vf when the steering speed in a steering direction of the helm 32 exceed the predetermined speed Sa in the steering direction of the helm 32. Note that the predetermined assist value Vf and the predetermined speed Sa can be user-configurable by operating the operation unit 41. For example, the predetermined assist value Vf can be set equal to the predetermined assist value Va. As a result, the autopilot device 40 decreases the amount of the second turning force applied to the rudder 22 to zero as the steering speed approaches zero, and increases the amount of the second turning force applied to the rudder 22 to a predetermined amount corresponding to the predetermined assist value Vf as the steering speed approaches the predetermined speed Sa. Furthermore, the autopilot device 40 keeps applying the predetermined force to the rudder 22 when the steering speed in a steering direction of the helm 32 exceed the predetermined speed Sa in the steering direction of the helm 32.

With this configuration, when the helmsman needs to rapidly steer the helm 32, the autopilot device 40 can assist the steering operation of the steering device 30 with larger force.

With the steering assist system 10 in accordance with the first embodiment, the steering assist control of the controller 43 is activated and inactivated by the operation unit 41. However, the steering assist control of the controller 43 can be activated and inactivated based on the steering speed detected by the steering sensors 36 and 38. In particular, the controller 43 can automatically activate the steering assist control when the controller 43 determine that the steering speed is not zero (i.e., the helm 32 is being operated), and inactivate the steering assist control when the controller 43 determine that the steering speed is zero (i.e., the helm 32 is not being operated).

Furthermore, the target steering assist value of the steering assist signal 58 can be set according to at least two of the angular position of the rudder 22, the moving speed of the marine vehicle 1 and the steering speed detected by the steering sensors 36 and 38. For example, the target steering assist value of the steering assist signal 58 is set according to all of the angular position of the rudder 22, the moving speed of the marine vehicle 1 and the steering speed detected by the steering sensors 36 and 38. In this case, the controller 43 receives the angular position of the rudder 22 from the rudder angle sensor 26, the moving speed of the marine vehicle 1 from the moving speed sensor 46 and the steering speed from the steering sensors 36 and 38. Then, the controller 43 calculates a first target value according to the angular position of the rudder 22 based on the relationship illustrated in FIG. 5 or FIG. 6, a second target value according the moving speed of the marine vehicle 1 based on the relationship illustrated in FIG. 7, and a third target value according to the steering speed from the steering sensors 36 and 38 based on the relationship illustrated in FIG. 8. The controller 43 then calculates a target steering assist value of the steering assist signal 58 based on the first to third target values. In particular, the controller 43 calculate a weighted average of the first to third target values with first to third predetermined weights that is preset for the first to third target values, respectively. Then, the controller 43 outputs the steering assist signal 58 indicative of the weighted average of the first to third target values to the autopilot pump motor 44. With this configuration, the target steering assist value of the steering assist value of the steering assist signal 58 can be set more adequately in the light of at least two of the following conditions: the angular position of the rudder 22, the moving speed of the marine vehicle 1 and the steering speed detected by the steering sensors 36 and 38.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Furthermore, the foregoing descriptions of the selected embodiments according to the present invention are provided for illustration only, and not for the purpose of limiting the invention as defined by the appended claims and their equivalents.

What is claimed is:
1. A steering assist system for a vehicle, comprising:
a turning device connected to the vehicle and being operable to influence a heading of the vehicle;
a steering device operable to apply a first turning force to the turning device to operate the turning device;
a steering sensor configured to detect a steering state of the steering device during which the steering device applies the first turning force to operate the turning device; and an autopilot device configured to automatically navigate the vehicle to a desired heading of the vehicle, the autopilot device including an actuator operable to apply a second turning force to the turning device to operate the turning device; and a steering assist control section configured to control the actuator to apply the second turning force to turn the turning device in the same direction that the first turning force is turning the turning device after a delay period has elapsed from a time that the steering sensor detects the steering state of the steering device and while the steering device is continuing to apply the first turning force to the turning device to operate the turning device.

2. The steering assist system according to claim 1, further comprising a turning angle sensor configured to detect a turning angle of the turning device; and a turning angle determination section configured to determine whether the turning device has reached a predetermined limit position of the turning device based on the turning angle; and the steering assist control section is further configured to prevent the actuator from turning the turning device beyond the predetermined limit position when the turning angle determination section determines that the turning device has reached the predetermined limit position.

3. The steering assist system according to claim 1, further comprising a turning angle sensor configured to detect a turning angle of the turning device; and the steering assist control section is further configured to control the actuator to adjust an amount of the second turning force based on the turning angle.

4. The steering assist system according to claim 1, further comprising a speed sensor configured to detect a moving speed of the vehicle; and the steering assist control section is further configured to adjust an amount of the second turning force applied to the turning device according to the moving speed of the vehicle.

5. The steering assist system according to claim 1, further comprising a steering rate sensor configured to detect a steering rate of the steering device, and the steering assist control section is further configured to control the actuator to adjust an amount of the second turning force applied to the turning device based on the steering rate of the steering device.

6. A steering assist system for a vehicle, comprising a turning device connected to the vehicle and being operable to influence a heading of the vehicle;

a steering device operable to apply a first turning force to the turning device to operate the turning device;

a steering sensor configured to detect a steering state of the steering device during which the steering device applies the first turning force to operate the turning device;

an autopilot device configured to automatically navigate the vehicle to a desired heading of the vehicle, the autopilot device including an actuator operable to apply a second turning force to the turning device to operate the turning device; and a steering assist control section configured to control the actuator to apply the second turning force to turn the turning device in the same direction that the first turning force is turning the turning device when the steering sensor detects the steering state of the steering device;

a speed sensor configured to detect a moving speed of the vehicle; and a moving speed determination section configured to determine whether the moving speed in a direction of travel of the vehicle is at least equal to a predetermined limit speed in the direction of travel of the vehicle; and the steering assist control section is further configured to prevent the actuator from turning the turning device when the moving speed determination section determines that the moving speed in the direction of travel of the vehicle is at least equal to the predetermined limit speed in the direction of travel of the vehicle.

7. A steering assist system for a vehicle, comprising:

a turning device connected to the vehicle and bein o erable to influence a headin' of the vehicle;

a steering device operable to apply a first turning force to the turning device to operate the turning device;

a steering sensor configured to detect a steering state of the steering device during which the steering device applies the first turning force to operate the turning device;

an autopilot device configured to automatically navigate the vehicle to a desired heading of the vehicle, the autopilot device including an actuator operable to apply a second turning force to the turning device to operate the turning device; and a steering assist control section configured to control the actuator to apply the second turning force to turn the turning device in the same direction that the first turning force is turning the turning device when the steering sensor detects the steering state of the steering device;

a speed sensor configured to detect a moving speed of the vehicle; and a moving speed determination section configured to determine whether the moving speed in a direction of travel of the vehicle is at least equal to a predetermined limit speed in the direction of travel of the vehicle; and the steering assist control section is further configured to decrease an amount of the second turning force applied to the turning device as the moving speed in the direction of travel of the vehicle approaches the predetermined limit speed in the direction of travel of the vehicle.

8. A steering assist device for a vehicle having a turning device that is operable to influence a heading of the vehicle, a steering device that is operable to apply a first turning force to the turning device to operate the turning device, and an actuator that is operable to apply a second turning force to the turning device to operate the turning device, the steering assist device comprising:

a steering state determination section configured to determine whether the steering device is being operated;

a steering assist control section configured to control the actuator to apply the second turning force to the turning device to turn the turning device in the same direction that the first turning force is turning the turning device after a delay period has elapsed from a time that the steering state determination section determines that the steering device is being operated and while the steering device is continuing to apply the first turning force to the turning device to operate the turning device.

9. The steering assist device according to claim 8, wherein the steering assist control section is further configured to control the actuator to adjust an amount of the second turning force applied to the turning device based on a turning angle of the turning device.

10. The steering assist device according to claim 8, wherein the steering assist control section is further configured to control the actuator to adjust an amount of the second turning force applied to the turning device according to a moving speed of the vehicle.

11. The steering assist device according to claim 8, wherein the steering assist control section is further configured to control the actuator to adjust an amount of the second turning force applied to the turning device based on a steering rate of the steering device.

12. A steering assist method for a vehicle having a turning device that is operable to influence a heading of the vehicle, a steering device that is operable to apply a first turning force to the turning device to operate the turning device, and an autopilot device that is configured to automatically navigate the vehicle to a desired heading of the vehicle with the autopilot device including an actuator that is operable to apply a second turning force to the turning device to operate the turning device, the method comprising:
   determining whether the steering device is being operated; and
   controlling the actuator to apply the second turning force to the turning device to turn the turning device in the same direction that the first turning force is turning the turning device after a delay period has elapsed from a time that the determining determines that the steering device is being operated and while the steering device is continuing to apply the first turning force to the turning device to operate the turning device.

13. The steering assist method according to claim 12, wherein the controlling comprises at least one of the following:
   controlling the actuator to apply the second turning force to the turning device to turn the turning device at a prescribed turning rate;
   controlling the actuator to adjust an amount of the second turning force applied to the turning device based on a turning angle of the turning device;
   controlling the actuator to adjust an amount of the second turning force applied to the turning device according to a moving speed of the vehicle; and
   controlling the actuator to adjust an amount of the second turning force applied to the turning device based on a steering rate of the steering device.

14. A steering assist device for a vehicle having a turning device that is operable to influence a heading of the vehicle, a steering device that is operable to apply a first turning force to the turning device to operate the turning device and an actuator that is operable to as el a second turning force to the turning device to operate the turning device, the steering assist device comprising:
   a steering state determination section configured to determine whether the steering device is being operated;
   a steering assist control section configured to control the actuator to apply the second turning force to the turning device to turn the turning device in the same direction that the first turning force is turning the turning device when the steering state determination section determines that the steering device is being operated;
   a speed sensor configured to detect a moving speed of the vehicle; and
   a moving speed determination section configured to determine whether the moving speed in a direction of travel of the vehicle is at least equal to a predetermined limit speed in the direction of travel of the vehicle; and
   the steering assist control section is further configured to prevent the actuator from turning the turning device when the moving speed determination section determines that the moving speed in the direction of travel of the vehicle is at least equal to the predetermined limit speed in the direction of travel of the vehicle.

15. A steering assist device for a vehicle having a turning device that is operable to influence a heading of the vehicle, a steering device that is operable to apply a first turning force to the turning device to operate the turning device, and an actuator that is operable to apply a second turning force to the turning device to operate the turning device, the steering assist device comprising:
   a steering state determination section configured to determine whether the steering device is being operated;
   a steering assist control section configured to control the actuator to apply the second turning force to the turning device to turn the turning device in the same direction that the first turning force is turning the turning device when the steering state determination section determines that the steering device is being operated;
   a speed sensor configured to detect a moving speed of the vehicle; and
   a moving speed determination section configured to determine whether the moving speed in a direction of travel of the vehicle is at least equal to a predetermined limit speed in the direction of travel of the vehicle; and
   the steering assist control section is further configured to decrease an amount of the second turning force applied to the turning device as the moving speed in the direction of travel of the vehicle approaches the predetermined limit speed in the direction of travel of the vehicle.

16. A steering assist method for a vehicle having a turning device that is operable to influence a heading of the vehicle, a steering device that is operable to apply a first turning force to the turning device to operate the turning device, and an autopilot device that is configured to automatically navigate the vehicle to a desired heading of the vehicle with the autopilot device including an actuator that is operable to apply a second turning force to the turning device to operate the turning device, the method comprising:
   determining whether the steering device is being operated;
   controlling the actuator to apply the second turning force to the turning device to turn the turning device in the same direction that the first turning force is turning the turning device when the steering device is being operated;
   detecting a moving speed of the vehicle; and
   determining whether the moving speed in a direction of travel of the vehicle is at least equal to a predetermined limit speed in the direction of travel of the vehicle; and
   the controlling of the actuator includes preventing the actuator from turning the turning device when the moving speed in the direction of travel of the vehicle is at least equal to the predetermined limit speed in the direction of travel of the vehicle.

17. A steering assist method for a vehicle having a turning device that is operable to influence a heading of the vehicle, a steering device that is operable to apply a first turning force to the turning device to operate the turning device, and an autopilot device that is configured to automatically navigate the vehicle to a desired heading of the vehicle with the autopilot device including an actuator that is operable to apply a second turning force to the turning device to operate the turning device, the method comprising:
   determining whether the steering device is being operated;
   controlling the actuator to apply the second turning force to the turning device to turn the turning device in the same direction that the first turning force is turning the turning device when the steering device is being operated;
detecting a moving speed of the vehicle; and
determining whether the moving speed in a direction of travel of the vehicle is at least equal to a predetermined limit speed in the direction of travel of the vehicle; and
the controlling of the actuator includes decreasing an amount of the second turning force applied to the turning device as the moving speed in the direction of travel of the vehicle approaches the predetermined limit speed in the direction of travel of the vehicle.

* * * * *